June 10, 1930.  O. BODEN  1,762,571
MEANS FOR MOUNTING DYNAMOS ON MOTOR VEHICLES
Filed Oct. 24, 1928
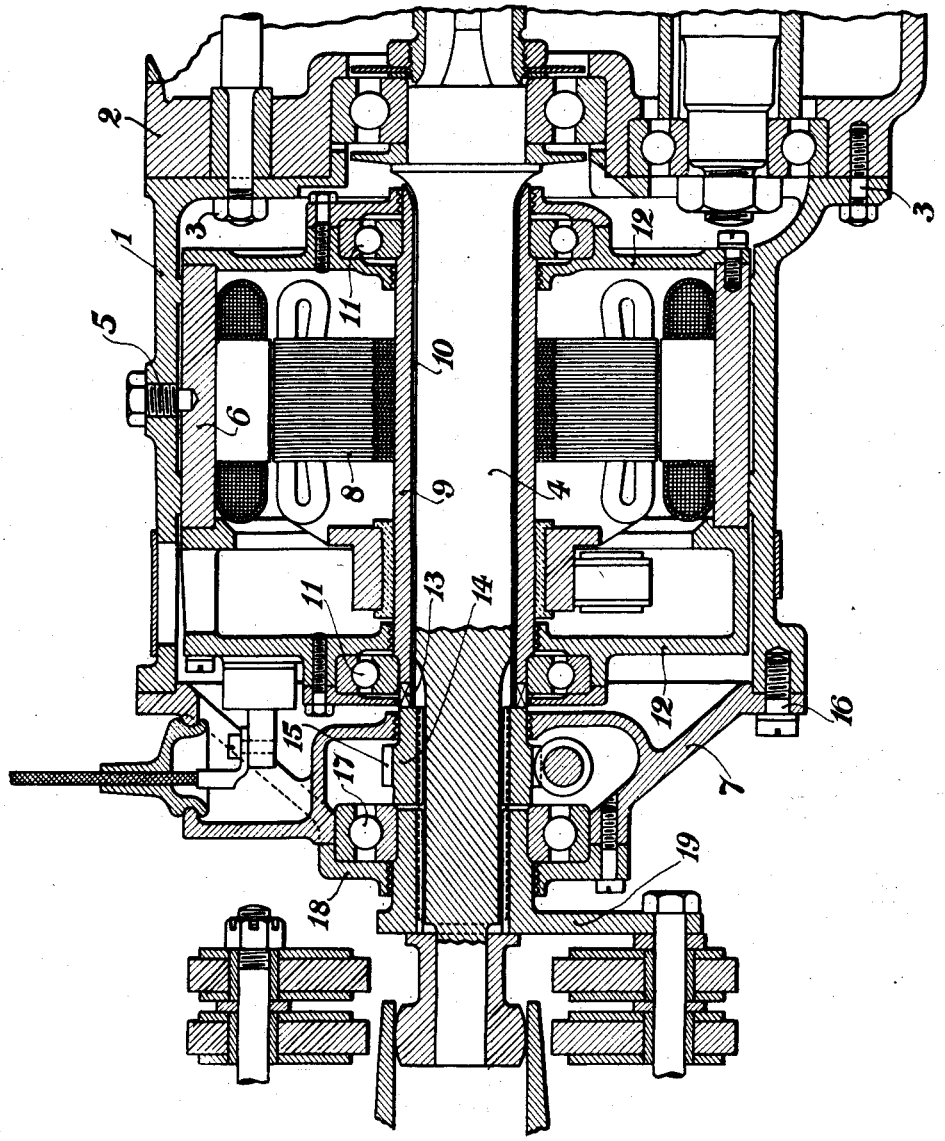
INVENTOR
OLIVER BODEN
BY
ATTORNEYS Patented June 10, 1930

1,762,571

UNITED STATES PATENT OFFICE

OLIVER BODEN, OF BIRMINGHAM, ENGLAND

MEANS FOR MOUNTING DYNAMOS ON MOTOR VEHICLES

Application filed October 24, 1928, Serial No. 314,623, and in Great Britain March 3, 1928.

This invention relates to dynamos for use on motor vehicles, and has for its object to provide an improved method of mounting the dynamo, which not only provides a cool running position for same, where it is unaffected by the heat from the engine, but which, in addition, avoids the necessity of having to keep the size of the dynamo within small limits, thus giving greater freedom in design, the improved method of mounting also, according to the preferred arrangement, avoiding the use of gearing with a consequent reduction of noise.

The invention consists in mounting the dynamo so that the armature or rotor surrounds the transmission shaft of the vehicle, means being provided for connecting the armature or rotor to the transmission shaft so that it is operated thereby, the dynamo being carried by a support, or being mounted within a housing disposed behind, or attached to, the gear-box. The armature of the dynamo may be carried by a sleeve surrounding the transmission shaft and rotatably mounted in bearings carried by the end cover plates of the dynamo or other fixed supports, the said sleeve being preferably operated through teeth or dogs on its one end engaging co-operating parts on a member fixed to the transmission shaft, thus constituting a direct drive.

A dynamo mounted on the transmission shaft of the vehicle in accordance with this invention is illustrated by the accompanying drawing, in which the dynamo is housed within a casing attached to the gear box, both the casing and the dynamo being shown in section.

Thus, referring to the drawing, the dynamo is arranged within a housing or compartment 1 disposed immediately behind the gear-box 2 of the vehicle, the said housing or compartment being rigidly fixed to the gear-box by bolts 3, and being arranged and constructed in such a manner that it completely surrounds the transmission shaft 4. The dynamo fits closely within the housing 1 and is secured in place within the latter by a screw 5 engaging the magnet 6 which carries the pole-pieces, the said housing having an open rear end, adapted to be closed, after the dynamo has been fitted in position, by a detachable cover 7. The armature 8 of the dynamo is mounted upon an open-ended sleeve 9 arranged in axial alignment with the transmission shaft 4 and surrounding the latter, the said sleeve being slightly separated from the said shaft by an annular clearance 10, and being rotatably supported at opposite ends within bearings 11 carried by fixed end plates 12 with which the dynamo is provided. Formed at the rear end of this rotatable sleeve 9 carrying the armature are dogs or teeth 13 which are arranged to engage co-operating parts formed upon the opposed face or end of a collar 14 fixed upon the transmission shaft 4, thus forming a coupling for operatively connecting the latter to the sleeve. The end of the transmission shaft may be splined, as shown, to form a driving connection with the part 15 of a universal joint, and the splines may be extended forwardly so as to key the collar 14 to the transmission shaft. The said collar may, if desired, carry peripheral teeth 15 to constitute a speedometer drive. The cover 7 for closing the dynamo housing 1 is provided with a central opening for the passage of the transmission shaft the said cover being attached to the open end of the housing by screws, such as 16, or in any other suitable manner, so that the dynamo is entirely enclosed. The cover may also be extended, as shown, to enclose the toothed collar 14, if desired, and the extended portion may carry a bearing 17 for supporting the end of the transmission shaft, the end of the extended portion being fitted with a cap 18.

When the vehicle is in motion the rotary movement of the transmission shaft 4 is transmitted to the sleeve 9 carrying the armature 8 of the dynamo through the medium of the dogs or teeth on the collar 14, which is fixed upon the transmission shaft, co-operating with the dogs on the end of the sleeve, thus forming a direct drive and causing the armature to rotate at the same speed as the transmission shaft, the absence of gearing resulting in a reduction of noise. The dynamo is, moreover, fully protected by the casing or housing 1 within which it is fixed, and it is in such a position that it is unaffected by the heat of the engine. The casing or housing may be of any suitable size, and the size of the dynamo is consequently not restricted, as in the case where it is mounted adjacent the engine, thus giving greater freedom in design.

Having fully described my invention, what I desire to claim and secure by Letters Patent is:—

1. In a motor vehicle, the combination of a transmission shaft for driving the road wheels, a variable speed gear for operating the transmission shaft, a gear box containing the variable-speed mechanism, a dynamo having a rotor surrounding the transmission shaft and operated thereby, and a support for the dynamo carried by the gear-box.

2. In a motor vehicle, the combination of a transmission shaft for driving the road wheels, a variable-speed gear for operating the transmission shaft, a gear-box containing the variable-speed mechanism, a casing carried by the gear-box, a dynamo housed within and supported by the casing, so that the armature of the dynamo surrounds the transmission shaft, and means for operatively connecting the armature to the transmission shaft.

3. In combination, a dynamo for motor vehicles having an armature and end plates, a housing for the dynamo, a gear box to which said housing is attached, a transmission shaft, a sleeve surrounding said transmission shaft and carrying said armature, bearings on the sleeve for supporting said end plates, means for fixing the dynamo within the housing, and means for operatively connecting the sleeve carrying the armature to the transmission shaft.

4. In combination, a dynamo for motor vehicles having an armature, a housing for the dynamo, a gear box to which said housing is attached, a cover plate attached to the end of the housing for enclosing the dynamo, a transmission shaft, a sleeve surrounding said shaft and carrying said armature, a collar fixed on the transmission shaft, and cooperating projections on the collar and sleeve for operatively connecting the sleeve to the transmission shaft.

5. In combination, a dynamo for motor vehicles having an armature and end plates, a housing for the dynamo, a gear box to which said housing is attached, a cover plate attached to the end of the housing for enclosing the dynamo, a transmission shaft, a sleeve surrounding and separated from said shaft and carrying said armature, bearings on the sleeve for supporting said end plates, means for fixing the dynamo within the housing, a collar fixed on said transmission shaft, and cooperating projections on the collar and sleeve for operatively connecting the sleeve to the transmission shaft.

In testimony whereof I affix my signature.

OLIVER BODEN.